United States Patent [19]

Huesing et al.

[11] 4,176,781

[45] Dec. 4, 1979

[54] APPARATUS FOR MONITORING AND CHECKING PROCESSOR OPERATION SEQUENCES

[75] Inventors: Jürgen Hüesing, Selent; Hans H. Lampe, Herrenberg, both of Fed. Rep. of Germany

[73] Assignee: International Business Machines Corporation, Armonk, N.Y.

[21] Appl. No.: 892,455

[22] Filed: Apr. 3, 1978

[30] Foreign Application Priority Data

Apr. 9, 1977 [DE] Fed. Rep. of Germany ....... 2715983

[51] Int. Cl.² ............................................. G06F 11/00
[52] U.S. Cl. ................................................. 235/304
[58] Field of Search ............................ 235/304, 304.1; 364/200, 900

[56] References Cited

U.S. PATENT DOCUMENTS

| 3,739,345 | 6/1973 | Janssens et al. | 364/200 |
| 4,025,768 | 5/1977 | Missios et al. | 235/304 X |
| 4,084,262 | 4/1978 | Lloyd et al. | 364/900 |

Primary Examiner—David H. Malzahn
Attorney, Agent, or Firm—Edward S. Gershuny

[57] ABSTRACT

Apparatus for monitoring and controlling the sequence analysis of processor operations in electronic digital computers. Each flip-flop in a flip-flop chain is associated with an operational step for setting up a monitoring and check sequence. The sequence is controlled by a flip-flop ring and consists of several steps each of which represents a monitoring or check function. An oscillator signal is fed to all flip-flop stages, together with a further control signal. Switching of flip-flops is effected in such a manner that at any one time only one flip-flop is on, its output signal and a coinciding oscillator signal generating a control signal which is converted in an address generator into an address for fetching a subroutine from a storage to control the monitoring and check function associated with the flip-flop.

8 Claims, 11 Drawing Figures

APPARATUS FOR MONITORING AND CHECKING PROCESSOR OPERATION SEQUENCES

DESCRIPTION

Technical Field

The invention relates to apparatus for monitoring and controlling sequence analysis of processor operations in electronic digital computers.

There are a number of known test and analysis units for checking operational sequences, for analyzing circuit and program errors and for developing maintenance recommendations from the analysis. However, each has one or more of the following disadvantages:

- Being frequently designed as portable units, they are not constantly available on the machine. This leads to longer waiting periods for the customer engineer and the customer when such units are required.
- They are expensive.
- Because of their complex circuit structure and the wear to which they are subjected during transport, such units are highly susceptible to failure.
- The units affect and change the failure situation to be analyzed when they are switched on.
- With regard to analyzing microprogram errors, their functions are limited.

The object of this invention is to eliminate the above-mentioned disadvantages and to provide a fully integrated technical solution for executing said function, which is particularly suitable for digital computers.

The invention has the advantage that the maintenance and check functions which are built into the respective digital computer reduce the proportion of the circuit costs, that the availability of the computer is increased, that its functions become more varied, that it is less susceptible to failure, and finally that said functions can be executed without the error situation, i.e., the original situation, changing upon the occurrence of an error.

BRIEF DESCRIPTION OF DRAWINGS

The invention will be described below by means of an embodiment shown in the accompanying drawings in which.

DISCLOSURE OF INVENTION

Figure 1:
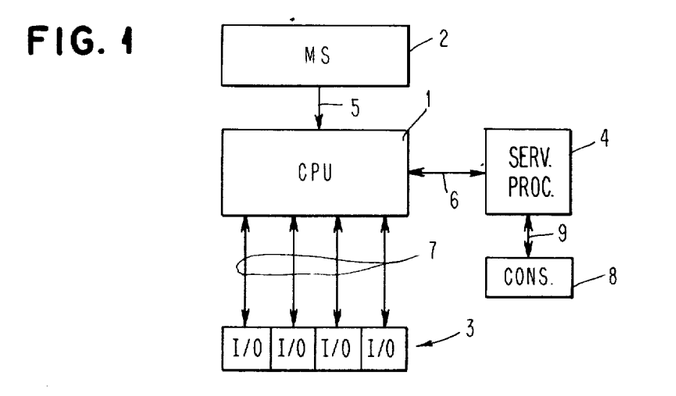
FIG. 1 is a general block diagram of an electronic data processing system in which this invention may be encoded.

FIG. 1 shows, by way of an example, the overall configuration of an electronic data processing system consisting of a central processing unit (CPU) 1, a main storage (MS) 2, the input/output units (I/O) 3, and a maintenance and service processor 4. The main storage 2 is connected via bus 5 to the central processing unit 1, while the input/output devices 3 and the maintenance and service processor 4 are connected to said processing unit via bus 7 and bus 6, respectively. In the preferred environmental system, the maintenance and service processor which is in charge of the system load, console control and diagnostic functions is assumed to be a processor with an interrupt mechanism having a total number of eight interrupt levels.

Figure 2A:
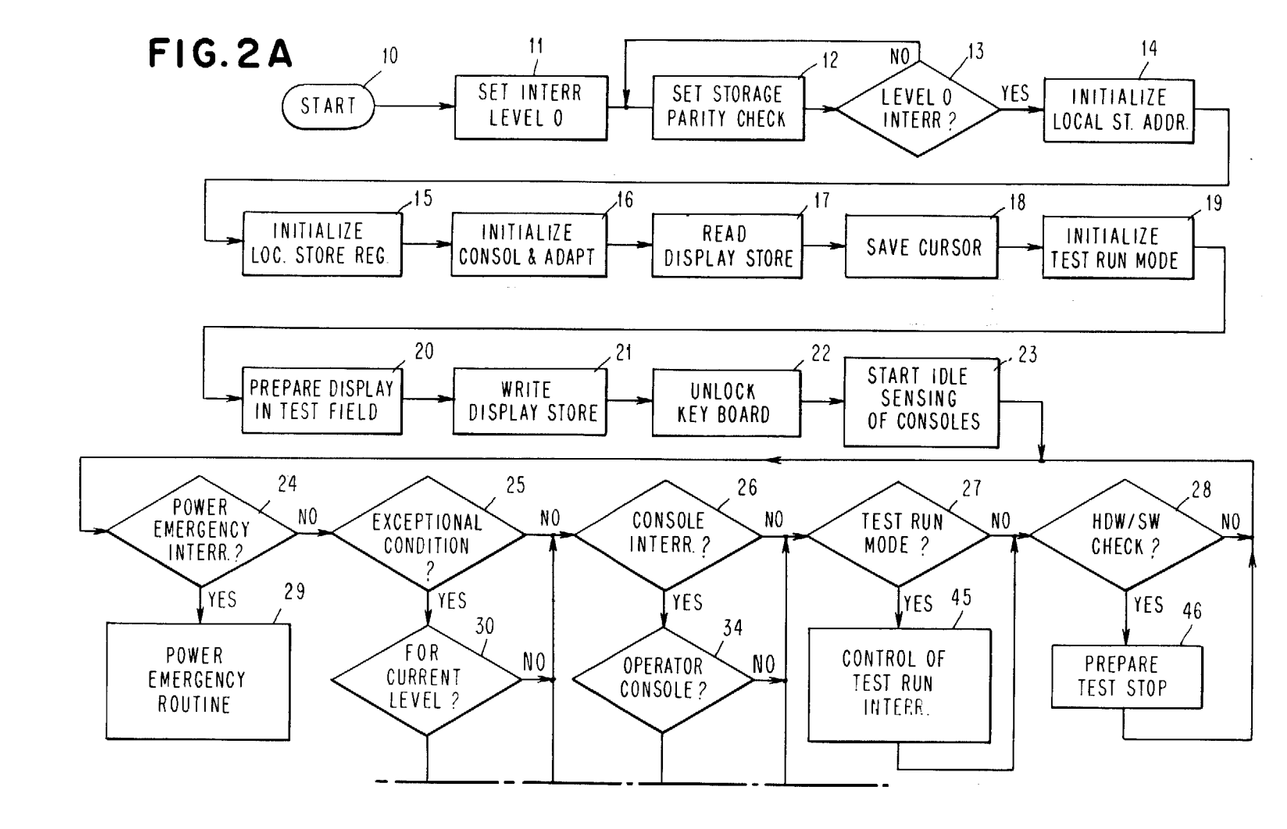
FIGS. 2a and 2b together form a flow diagram illustrating maintenance and check functions that may be executed by the preferred embodiment of the invention.
Figure 2B:
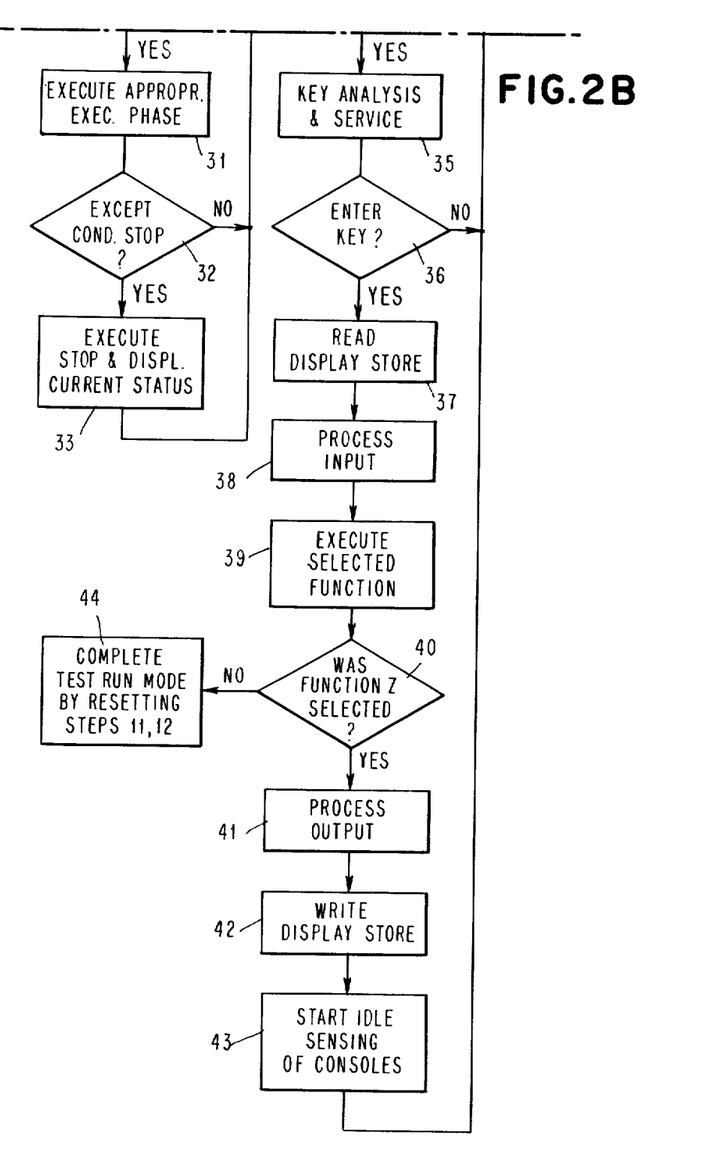

In an electronic data processing system that is expected to work reliably this maintenance and service processor 4 must be independently checked, diagnosing the error cause in the case of an error. The circuit arrangement shown in detail in FIG. 3 serves to check whether the maintenance and service processor 4 operates satisfactorily. The operation of these check and diagnostic means is shown in FIG. 2.

The system integrated check functions for the maintenance and service processor 4 are effected via the system console (CONS) 8 which, as shown in FIG. 1, is connected to the maintenance and service processor 4 via a connecting line 9. This console may consist of a screen display unit and a keyboard, through which the maintenance and service personnel on the one hand and the electronic data processing system on the other communicate with each other. For the handling of the check functions, it is advantageous to reserve on the screen one line for representing several characters and one key of the keyboard for the start key.

The control signals controlling the sequence of the check operations are generated by a flip-flop chain. By actuating, for example, a switch especially provided for this purpose, the chain is activated in the case of an assumed processor error.

After activation of the chain, the control signals for executing the check functions occupy the interrupt level with the highest interrupt priority in maintenance and service processor 4, thus ensuring that the error check takes priority over all the remaining functions to be performed by the maintenance and service processor.

During normal operation, (i.e., in a mode in which the check function sequence is not activated) all interrupts of the maintenance and service processor 4 are directly controlled by its circuits, provided that the interrupt mechanism is circuit and not microprogram controlled, as may well be the case.

In each case a control unit simulated in accordance with the interrupt mechanism must take care of the housekeeping and the control of the interrupt levels, eight interrupt levels 0 to 7 in the chosen example.

After activation of the check function sequence at priority level 0 (the "highest" priority) the sequence dominates the monitoring and control ring for the sequence analysis of the computer operations in accordance with FIG. 2. In addition to the simulated interrupt function, all of the following check functions are performed:

1. Monitoring the internal power supply (to initiate in cases of emergency the cut-off provided for this purpose),
2. Monitoring exceptional sequence conditions,
3. Monitoring the control statements from the system console 8 (FIG. 1), and
4. Monitoring the processor for sequence errors that may have been caused by the microprogram or the control circuits.

The following table shows an example of check functions that may be integrated into the system.

TABLE I

A = Alteration of storage contents
B = A with automatic incrementation of storage address
C = Instruction address comparison (prior to executing the instruction specified in the address field)
D = Display of storage contents
E = D with automatic incrementation of storage address
F = Display of interrupts of input/output units
G = Display of programmable interrupts
H = Display of processor error register contents
I = Instruction step control
K = Alteration of local storage contents
L = Display of local storage contents
M = Display of interrupt master mask (in the case of machines with master mask controlled interrupts)
N = Display of the common control mask for the interrupts
O = Alteration of program status words 1 to 7 (interrupt levels 1 to 7)
P = Display of program status words 1 to 7
Q = Resetting of storages containing processor and program errors
R = Micro instruction address comparison start
S = Instruction address comparison stop (prior to executing the storage write instruction at the storage address specified in the address field)
T = Instruction address comparison stop (prior to executing the storage read instruction from the storage address specified in the address field)
W = Instruction address comparison stop (when exchanging two program status words in the case of an interrupt level change)
X = Instruction address comparison stop (when entering the program specified in the address field)
Y = Address comparison stop (when storage access is made at the address specified in the address field)
Z = Switching off the check sequence mode The above table provides examples of functions that are significant in a service processor on which this specification is based. For other service processors other functions may be significant, whose satisfactory execution needs checking.

By operating the start key 10 in FIG. 2, which is contained in the keyboard associated with the console, the highest interrupt level is activated. As a result of this, the program status word provided for this interrupt level is assigned control of the processor. Concurrently with this activation, the flip-flop chain is started.

By pressing the start key, the check sequence assumes control of the check and diagnostic means, in order to secure the necessary information for performing and initializing the check and diagnosis.

As shown in FIG. 2, initialization consists of steps 10 to 23. The individual steps correspond to functions performing the tasks specified in the individual boxes. The first step 10 consists of actuating the start key. As a result of this, step 11 is initiated, by means of which the highest priority (level 0) is entered into the interrupt mask. The control of the interrupts by means of an interrupt mask is a feature of the maintenance and service processor used in the present example. By forcing priority level 0 in step 11, it is ensured that the highest priority will be observed for the whole check sequence.

Subsequently, in step 12 a storage parity error is set so that after actuation of the start key the highest interrupt level is kept active. This is so because in the present system a storage parity error is assigned the highest priority level anyway.

Figure 5:
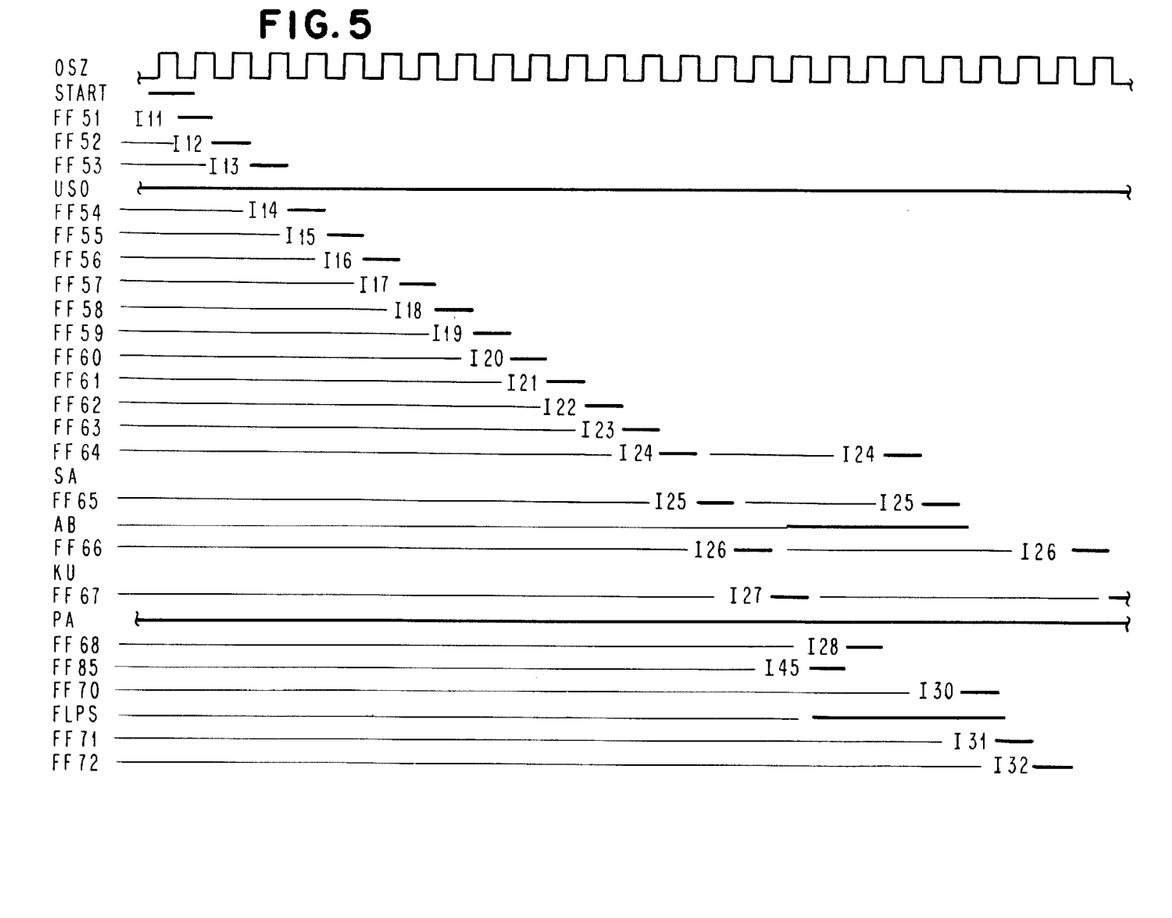
FIG. 5 is a pulse time diagram depicting the monitoring and check sequence times.

In the next step 13 it is merely checked whether step 12 was actually performed in the manner provided for (control signal USO, FIG. 5). This is followed by step 14 in which the addresses required for the check sequence provided for are transferred to the local storage.

In step 15 all necessary local storage registers are initialized, in order to automatically activate the desired check sequence. In the subsequent step 16 the operator console and the console adapter are initialized. In step 17 the current contents of the whole screen display storage of the operator console is read, and in step 18 the cursor is stored, so that it can be regenerated upon completion of the check and diagnostic functions.

In step 19 the initialization steps for the check sequence mode are executed under control of the sequence control unit.

Subsequently, processing of the screen output information for the initialized check field can begin on the screen. This is effected in step 20. In step 21 the display storage of the operator console is written, releasing the keyboard of the console in step 22.

The preferred environmental data processing system has more than one console, such as console 8 in FIG. 1, which is connected to the maintenance and service processor 4 via an adapter (not shown). Therefore, the consoles have to be checked to determine whether information is available. This so-called automatic idle sensing of the consoles by means of the console adapter beings in step 23. As shown in FIG. 2, this step 23 terminates the initialization phase for the check sequence mode, so that the actual check (monitoring) sequence can begin. As a result of this, the monitoring and control ring for the sequence analysis of the arithmetic operations, which is hereinafter referred to as "orbit," is assigned overall control of the maintenance and service processor.

Orbit begins operation with step 24 in which is determined whether there is a need for cutting off the internal power supply, based on the existence of certain fault messages from the test circuits in the data processing system. If this is the case (control signal SA, FIG. 4) a specific emergency is initiated (step 29) which cuts off the power supply in the unit according to very definite criteria. If there are no such specific fault messages from the test circuits of the system, there are checks (step 25) whether there are any exceptional conditions in the system. For this purpose certain flip-flops can be checked which are always set by the data processor when there is an exceptional condition coordinated to a flip-flop. Such exceptional conditions may be, for example, an address comparison stop for instructions and/or data, instruction sequencing or such. If such an exceptional condition is found (control signal AB, FIG. 5) the system determines, for example, whether this exceptional condition is valid for the current priority step (step 30). If this is the case (control signal FLPS, FIG. 5) the system then performs (step 31) the functional phase related to that instruction. If this is not the case, there is a return to orbit where step 26 is performed. If the exception condition is valid for the current priority level, the system addresses the corresponding exception routine (step 31) which decides on an emergency stop if the condition is given (step 32—control signal ABST). In case of a stop, the system performs all necessary individual functions (step 33) and indicates on the console of the current stop status. Then orbit is continued with step 26. Step 26 would also follow if an exception stop could not be performed. At orbit step 26, the system determines whether there are console requests for interruption, e.g. from a console signaling for service. If this is not the case, the test sequence is continued in orbit with step 27. However, if an interruption console has set up an interruption request signal (control signal KU) it is first determined whether it is from the proper operator or main console. If that is not the case, the test sequence is also continued with orbit step 27; if, however, it is from the main console (control signal KB), step 35 calls for the routine which performs the recognition of keys and the necessary service. Then, during step 36, it is determined whether the actuated console key is an input key. If this is not the case, the test sequence is continued with step 27 of orbit.

However, if it is determined that it is an input key (control signal EGT), the execution of the sequencing test functions selected via the console is continued starting with step 37 which causes the reading of the display screen and, to that extent, is identical with step 17 of the initializing phase. Then (in step 38) the system processes the input key, and (in step 39) the system executes the selected sequence check functions.

This is followed by a check (step 40) to determine whether or not the actuated key in the main console is the termination key "Z" which serves to terminate the monitoring and check sequence.

If the pressed key is a key other than "Z," then the output information is processed (step 41) and written into the screen storage (step 42). Idle sensing of the consoles by the console adapter again takes place in step 43 which is identical with step 23 of the initialization phase. This concludes the execution of the sequence check function selected via the system console so that, within orbit, the sequence proceeds to step 27 and the system initially determines whether the mode concerned is a check sequence mode. If it is not, the test sequence proceeds to step 28. If it is determined, however, in step 27 (control signal PA, FIG. 5) that the maintenance and service processor is in the check sequence mode, the check sequence interrupt control is operated in step 45. Upon completion of this, the check sequence continues with step 28 in which it is determined whether a processor circuit or program error exists in the system. In the absence of such an error, the check cycle is driven back to its first step 24 and then through all the remaining steps previously described.

If it is determined, however, in step 28 that a processor circuit or program error exists somewhere in the machine (control signal PPF), then preparations are made for an error-specific check stop (step 46) again controlling said stop by a number of subroutines.

Subsequently, a new monitoring and control orbit cycle begins for the renewed sequence analysis of the processor operations.

As previously mentioned in connection with step 40, after the selected function has been executed the system test whether function Z (cf. table 1) was the selected one. If it is found that it was, i.e., that the key for switching off the sequence analysis was operated from the main console, the check sequence is terminated by rendering steps 11 and 12 of the initialization phase ineffective. This can be effected, for example, by resetting a flip-flop or latch circuit which was set in the initialization phase for determining interrupt level 0, as well as by resetting the storage parity error circuit which was also set in the initialization phase for quasi simulating a storage parity error. Upon completion of this, the check and monitoring mode ends and the maintenance and service processor can continue its normal operation from the point at which it was interrupted by the execution of the check mode.

While FIG. 2 served to describe which processor components are checked and how checking generally proceeds, FIGS. 3a to 3e and FIG. 4 show the essential circuit components used to implement the check sequence. FIG. 5 shows, by way of a pulse diagram, how the individual circuits interact. FIGS. 3a through 3e show that the clock pulses supplied by an oscillator control a chain of flip-flops 51 to 86. The flip-flops used in this case can be structured in such a manner that they are switched when the negative edge of the rectangular oscillator pulses is encountered. If two negative edges are simultaneously encountered, one on setting input S and one on resetting input R, as is the case when a start signal is present, flip-flop 51 is switched to a state which is opposite to that in which it was. However, the negative edge of the next rectangular pulse of the oscillator signal immediately resets the flip-flop via resetting input R. This ensures that each flip-flop remains switched on only for the duration of one oscillator pulse.

When the check sequence mode is switched on by operating the start key on the keyboard of the operator console an "asynchronous" start pulse is generated which is synchronized in AND gate 51a with the next oscillator pulse. After one oscillator pulse period this flip-flop is reset, as previously mentioned. The negative edge of the output signal of the reset flip-flop switches on the next flip-flop, in this case flip-flop 52. In addition, the output signal of the switched on flip-flop is combined in AND gate 51c with the next rectangular oscillator pulse, thus generating signal I11 on the output of said gate.

The output signals of the AND gates of all flip-flops 51 to 86 are such that they are used to generate in an address generator 90 (FIG. 4) the addresses AR11 to AR46 of subroutines, by means of which the actual check functions are subsequently controlled. The addresses AR11 to AR46 each point at the first address of a subroutine, reference numbers 11 to 46 referring to the flow diagram in FIG. 2 in which the same reference numbers indicate the associated function of the subroutine.

As a function of different conditions (which are also shown in the flow diagram of FIG. 2) the switching time sequence for the flip-flops contained in the chain is changed. As a result of this, it is necessary to switch the output of several flip-flops, providing on the input of several other flip-flops a number of flip-flops which are switched earlier.

Figures 3, 3B:
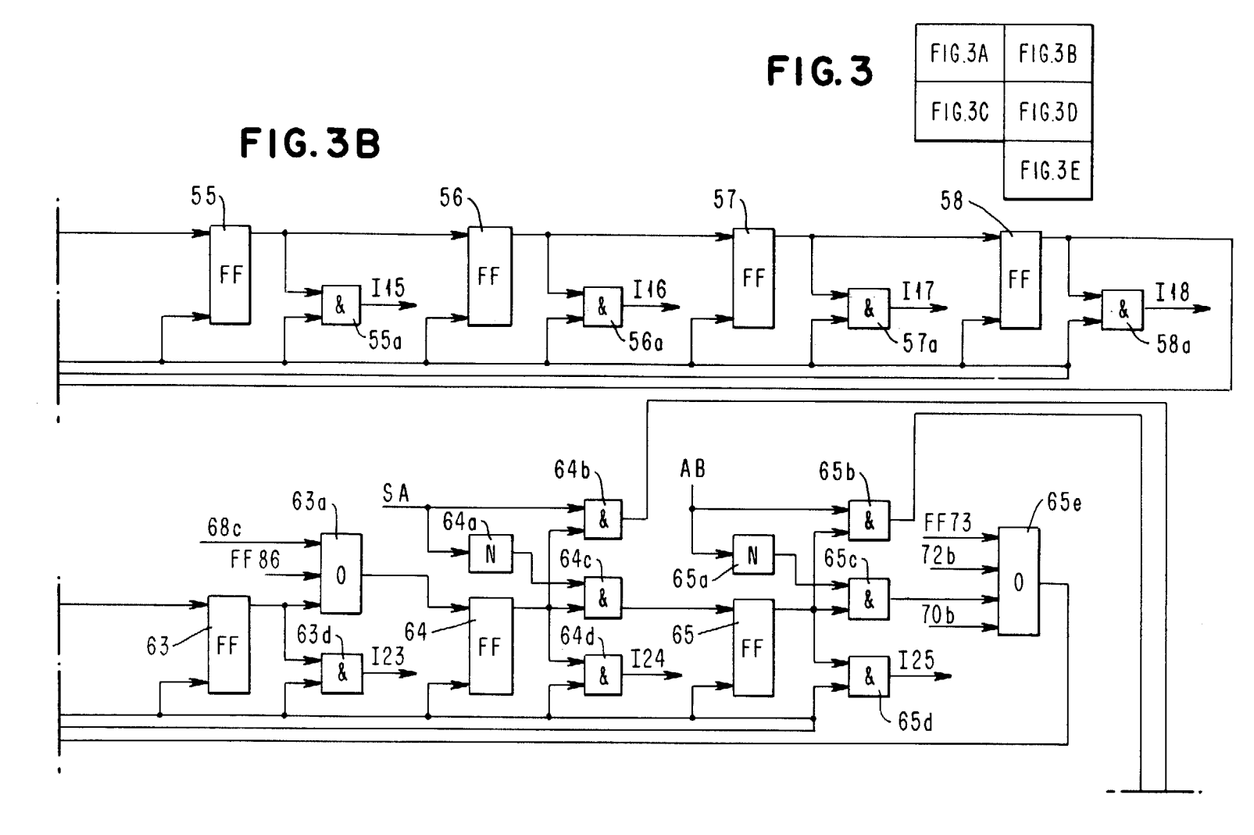
FIG. 3 shows the manner in which FIGS. 3a through 3e fit together to form a single diagram.
FIGS. 3a, 3b, 3c, 3d and 3e together form a block diagram of the sequence controls for executing the monitor and check sequence.
Figure 3A:
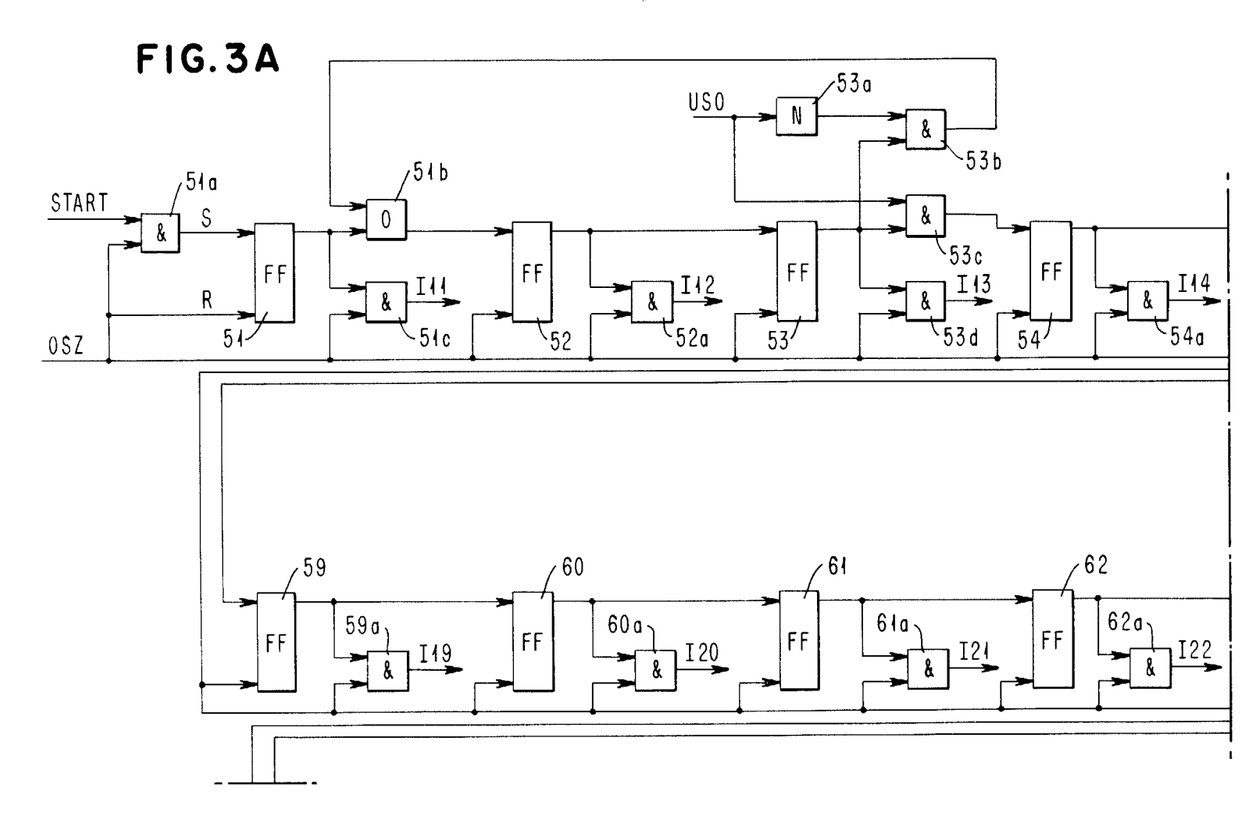

The special features of the circuit, in particular those resulting from the tests in the check flow diagram of FIG. 2, will be described in detail below. OR gate 51b between flip-flop 51 and 52 permits setting flip-flop 52 either by means of an output signal of flip-flop 51 or by means of an output signal of flip-flop 53. This OR condition is necessary, since, as shown in FIG. 2, in the initialization phase the advance from sequence step 13 to sequence step 14, i.e., from subroutine 13 to subroutine 14, depends upon the result of step 13. If the result of this test is that interrupt level 0 is set, then signal USO is generated which, as shown in FIG. 3a, enables the setting of flip-flop 54 and thus the generation of the first address of subroutine 14.

If signal USO cannot be formed because of a negative test result, then the negative edge of the next oscillator pulse again switches on flip-flop 52, thus once again fetching the subroutine for the implementation of step 12.

According to the example in FIG. 5, signal USO was present from the beginning, so that the flip-flop chain is continuously switched from flip-flop 53 to flip-flop 63. The output signals 114 to 123 of these flip-flops generate in each case the start address of the subroutine associated with their control flip-flop and thus with the respective function. As previously mentioned, the address generated in address generator 90 (FIG. 4) on the basis of output signal 122 of flip-flop 62, for example, serves to fetch the first instruction of a routine which in the flow diagram of FIG. 2 in the block associated with step 22 is designated as "release keyboard." The reference number of the flip-flop output signal, in the present case 22, is associated with the same reference number 22 in the flow diagram of FIG. 2. In this manner it is possible to identify by means of the number of the flip-flop output signal in FIGS. 3a through 3e (e.g., 111) and the identical number in the flow diagram in FIG. 2 that function (e.g., 11) which is implemented by means of the corresponding subroutine.

Before the actual check orbit CH is entered, after the initialization phase IN is completed, the call of routine 24, which is provided to determine whether an emergency power cut-off is necessary, depends only on the output signal of flip-flop 63, since at the beginning of the first cycle the end of the check cycle, as denoted by test 28, has not yet been reached. As with several cycles the routine corresponding to step 24 depends upon the result of the test in step 28, there are two further alternatives, realized by two further flip-flop output signals, for controlling step 24. To this end OR gate 63a in FIG. 3b is used. OR gate 63a controls the switching of the flip-flop chain to flip-flop 64 by means of the output signals of flip-flops 68 and 86, not considering flip-flop 63 used after completion of the initialization phase. The switching of the chain to flip-flop 65 depends upon the result of step 24, as shown in FIGS. 2 and 3b. If a cut-off of the power supply is found necessary, then output signal SA is generated which, rather than switching on flip-flop 65 as the next flip-flop in the chain, switches on flip-flop 69 which causes a routine to be initiated, by means of which the emergency cut-off of the processor power supply is effected.

This brings the whole check mode to a standstill, and it is, of course, necessary in such a case to start the machine afresh, the same applying to the initialization phase if the check sequence mode is to be reimplemented.

In electronic data processing systems the highest priority is generally assigned to the cut-off of the power supply. But since, as previously mentioned in connection with FIG. 2, the check sequence mode is assigned the highest interrupt level (cf. sequence steps 11 to 13) the interrupt priority level for cutting off the power supply drops by one level. For this reason it has to be checked in orbit in step 24 whether the power supply has to be cut off.

Figure 3C:
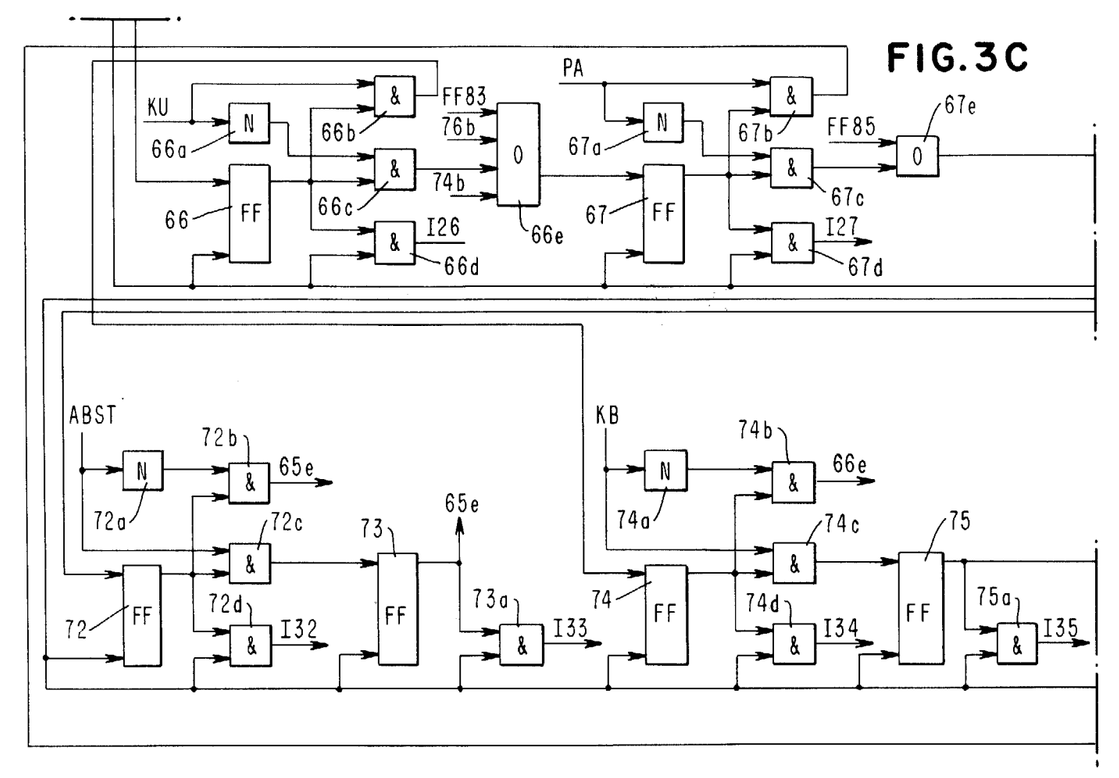
Figure 3D:
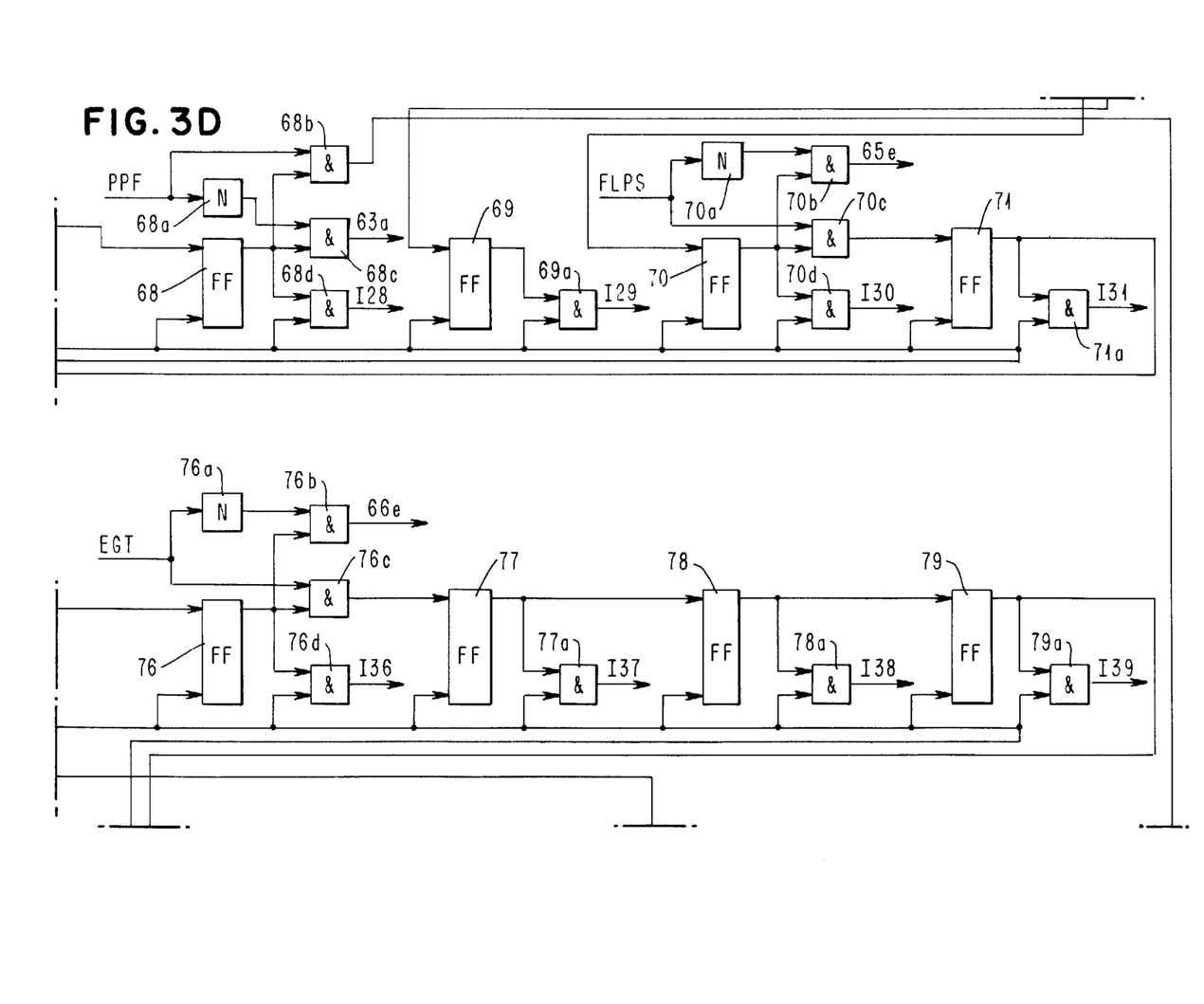

If the test in step 24 yields a negative result, meaning that signal SA was not generated, flip-flop 65 is switched on. Whether switching continues to flip-flop 66 depends, as is shown very clearly in FIG. 2, on the result of a number of further tests. If an exceptional condition is found to exist in step 25 which is used to check such a condition, then control signal AB is generated and flip-flop 70 is switched on as the next flip-flop via AND gate 65b. The output control signal of flip-flop 70 triggers step 30 in which, as shown in FIG. 2, the system checks whether the exceptional condition exists for the priority level currently applicable. If the condition does not exist, the next flip-flop 66, as shown in FIG. 3c, is switched on via inverter 70a, AND gate 70b and OR gate 65e, and step 26 of orbit is executed. However, if it is determined in step 30 that the exceptional condition does exist with regard to the current priority level, then control signal FLPS is generated and flip-flop 71 is switched on via AND gate 70c. This triggers step 31 which controls the implementation of the corresponding instruction execution phase. When flip-flop 71 is reset, flip-flop 72 is switched on in combination with the negative edge of the next rectangular oscillator pulse, flip-flop 72 initiating the execution of step 32 in which it is also checked whether the exceptional condition is to be stopped. If the condition does not exist, flip-flop 66 which would also trigger the next step 26 of orbit is switched on via inverter 72a, AND gate 72b and OR gate 65e.

If it is, however, determined in step 32 that the exceptional condition has been stopped, then control signal ABST is generated. As flip-flop 72 is reset, this signal switches on flip-flop 73 via AND gate 72c. Flip-flop 73, together with AND gate 73a, generates output signal 133 which, in its turn, triggers step 33 which is provided for executing the stop and for indicating the current status.

Subsequently, the next flip-flop 66 which starts the implementation of step 26 is switched on via OR gate 65e. As shown in FIG. 2, this step serves to check whether an interrupt request has been transmitted to the system via an operator console. If such an interrupt request is not present, then step 27 is the next check cycle step to be implemented. If, on the other hand, an interrupt is present, control signal KU is generated. This control signal is fed to flip-flop 74 via AND gate 66b (FIG. 3c), causing flip-flop 74 to be switched on with the aid of a rectangular oscillator pulse. Output signal 134 generated by flip-flop 74 triggers step 34 during which the system determines whether the interrupt request present was issued by the main console. As only such a request is to be taken into account, step 27 is implemented when a main console interrupt is not present. If, on the other hand, the interrupt is a main console interrupt, then control signal KB is generated, as shown in FIG. 2. As flip-flop 74 is reset, control signal KB switches on flip-flop 75 of the chain via AND gate 74c, leading to the implementation of step 35. This step serves to determine which key of the operator console is concerned and to operate the key in question, if necessary. This is followed by step 36, by means of which it is checked whether the pressed key is the input key. Whether step 37 or step 27 is subsequently again implemented depends on the result of this comparison. If the pressed key is not the input key, then flip-flop 67 is set via inverter 76a, AND gate 76b and OR gate 66e, thus initiating step 27.

If it is, however, determined in step 36 that the pressed key is the input key, then the associated subroutine generates control signal EGT. This means that flip-flop 76 returning to its initial state sets flip-flop 77 via the actuated AND gate 76c.

By means of control signal 137 generated by flip-flop 77 the address of the subroutine associated with step 37 is called after formation of the first address of said routine. As shown in FIG. 2, the latter routine concerns the reading of the display screen storage.

Together with the negative edge of the next rectangular oscillator signal flip-flop 77 returning to its initial state sets flip-flop 78, by means of which step 38, the processing of the input data, is invoked.

Then flip-flop 79 is set leading to step 39 being implemented. The resetting of flip-flop 79 causes flip-flop 80 to be set, by means of which step 40 is implemented in which it is checked whether the selected function was function Z. As shown in table I, the test cycle is set off upon actuation of key Z. If the pressed key was key Z, then control signal FZ is generated which, as flip-flop 80 is reset, sets flip-flop 84 via AND gate 80b, thus generating signal I44 which in turn initiates step 44 in FIG. 2. Upon completion of step 44 the test cycle as such is completed, since the essential control signals activated in steps 11 and 12 are deactivated with the aid of step 44.

Figure 3E:
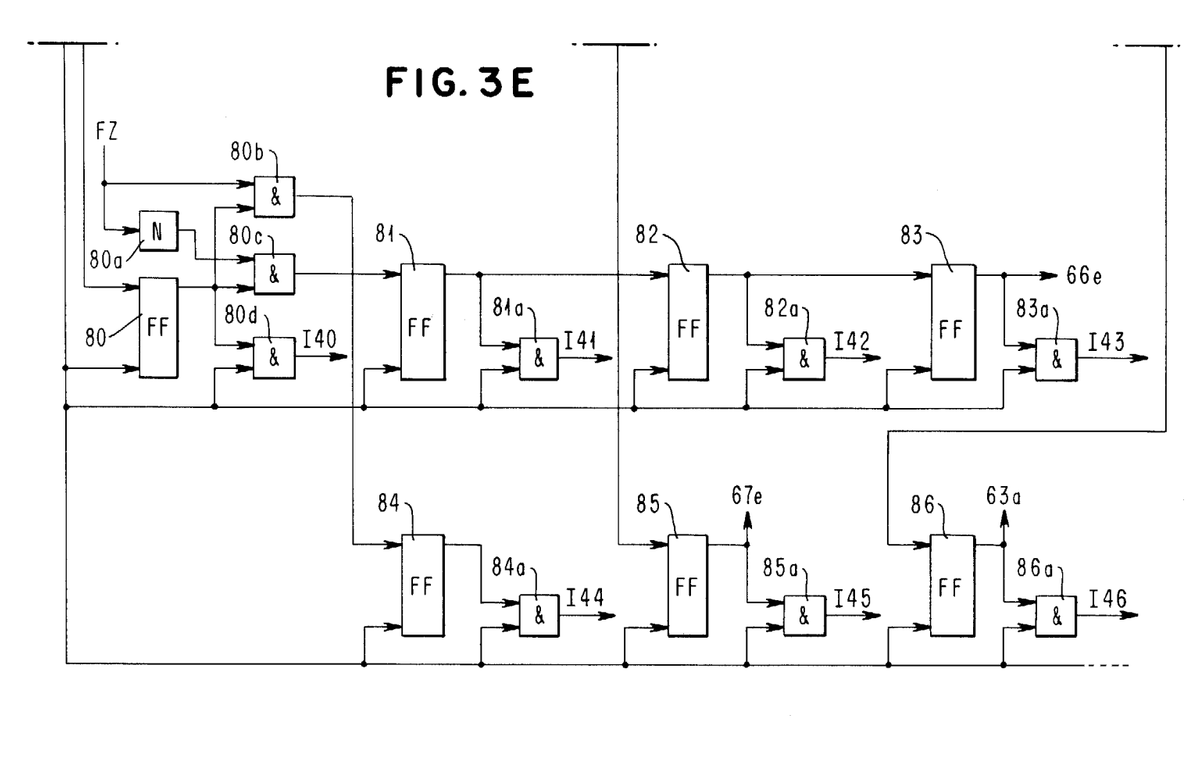

If the result of check step 40 is negative, i.e., at that time no Z key was pressed on the keyboard of the operator console, then the test cycle continues with step 41. As no control signal FZ was generated, AND gate 80c is enabled via inverter 80a when flip-flop 80 in FIG. 3e is set. The output signal of AND gate 80c together with the negative edge of the next rectangular oscillator pulse sets flip-flop 81. As a result of this, control signal I41 is generated via AND gate 81a in the manner previously described. This leads to step 41 in FIG. 2 being initiated. This step serves to process the output data.

As flip-flop 81 is reset, flip-flop 82 is switched on, thus generating signal I42 for initiating step 42. In step 42 the display screen is loaded with the processed output data. Resetting flip-flop 82 switches on flip-flop 83, thus enabling the latter to generate output signal I43. As a result of this, step 43 is initiated, by means of which the start of the idle sensing of the connected consoles is controlled.

As shown in FIG. 3c, the output of flip-flop 83 is connected to OR gate 66e. The output of said OR gate leads to one input of flip-flop 67. The output signal of the resetting flip-flop 83 thus sets flip-flop 67, so generating control signal I27. This signal initiates step 27 in which it is tested whether a check sequence mode still exists. If it does, control signal PA will set flip-flop 85 (FIG. 3) via AND gate 67 (FIG. 3c). As a result of this, control signal I45 is generated, by means of which step 45 is initiated. In accordance with existing priorities, the latter step assigns control to the program of the highest interrupt level for the duration of the test cycle in orbit.

As shown in FIG. 3e, the output of flip-flop 85 leads to OR gate 67e in FIG. 3c. The resetting flip-flop 85 sets flip-flop 68 coincident in time with the trailing edge of the next rectagular oscillating pulse. Flip-flop 68 generates control signal I28 for implementing step 28 in check orbit. This step serves to determine whether test circuits indicating a processor or program error have been set in the machine to be monitored. If they have not, the output signal of the resetting of flip-flop 68 is transferred via AND gate 68c, to OR gate 63a in FIG. 3b. The output signal of OR gate 63a sets flip-flop 64, so that control signal I24 again initiates step 24 in the check orbit. This starts a new cycle of the check sequence.

If it is determined in step 28 that an error check circuit has been set somewhere in the data processing system, then control signal PPF is generated. This control signal is transferred via AND gate 68b (FIG. 3d) when flip-flop 68 resumes its initial state to flip-flop 86 (FIG. 3e) setting flip-flop 86 coincident with the trailing edge of the next rectangular oscillator pulse. At the same time, control signal I46 triggering step 46 in FIG. 2 is generated on the output of AND gate 86a. This step serves to prepare for the check stop. The output signal of flip-flop 86 is also fed to OR gate 63a.

Via the output of OR gate 63a the end of the check orbit links up with the start, so that a new check cycle can also be started in this manner.

FIG. 5 shows an example of the pulse time distribution of the steps controlled by the rectangular oscillator signal, both in the initialization and the check sequence phase, a control flip-flop being associated with each of these steps. After the start signal, the flip-flop chain is initially continuously controlled from flip-flop 51 to flip-flop 64, since, as shown in the sixth line of FIG. 5, control signal US0 is present. Since signal SA between flip-flop 64 and flip-flop 65, which would have indicated a power cut-off, is not present, the next flip-flop 65 in the chain is switched on by means of the trailing edge of the next rectangular oscillator pulse.

Signals AB and KU are not formed either because a console interrupt has not occurred. Therefore, the trailing edge of the next rectangular oscillator pulse switches the next flip-flop 67 of the chain. Then, because signal PA is detected at the end of step 27, following the discontinuation of the check sequence mode, the sequence changes instead of continuing with step 28. As a result of this, the negative edge of the next rectangular oscillator pulse switches flip-flop 85. Subsequently, as the negative edge of the next rectangular oscillator pulse is encountered, flip-flop 68 is switched, and the check orbit continues with step 28. The flip-flop 64 is set as shown in FIG. 5, and a new check cycle begins. In the absence of an SA signal, this step is followed by the unstable phase of flip-flop 65, which is associated with check step 25. As in this step signal AB is found to be present (because in the example it is assumed that an exceptional condition exists) flip-flop 70 is set by the trailing edge of the next rectangular oscillator pulse. As signal FLPS is also present, the next flip-flop 71 in the chain is set, the step sequence below step 25 being continued with step 31. Setting flip-flop 72 causes step 32 to be implemented. As no exceptional stop condition exists, i.e., signal ABST is not present, flip-flop 66 is the next one set, initiating the next step 26 in the check orbit.

The further control activities for completing or terminating the check cycle can be readily derived from the above description, so that further details can be omitted.

Figure 4:
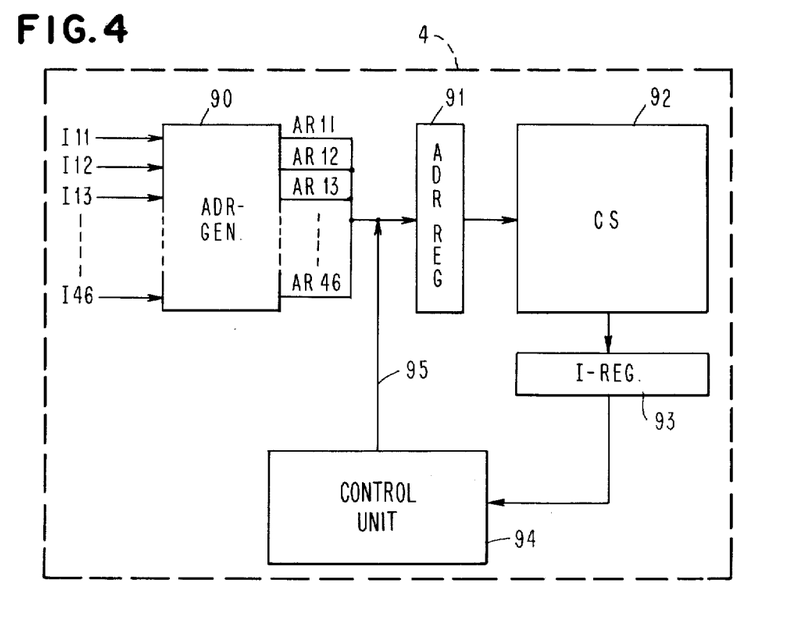
FIG. 4 is a block diagram representing the address generation necessary for the sequence control.

As previously mentioned, control signals I11 to I46, as shown in FIG. 4, are converted in an address generator 90 into addresses AR11 to AR46 which point in each case at the first instruction of a program subroutine in storage 92.

This storage can form part of a control storage (CS) or take the form of an additional read/write or read-only storage.

By means of address AR12, for example, the first instruction for implementing the subroutine associated with step 12 is read via the address register (ADR-REG) 91 from storage 92 into the instruction register (I-REG) 93 whence it is applied to a control unit 94 which executes the instruction, transferring the sequential address of the next instruction of the same subroutine via line 95 to address register 95. The latter register serves to read the next instruction into the instruction register.

For implementing the check sequence there are essentially two alternatives of linking the subroutines.

Firstly, the duration of the rectangular oscillator signal can be chosen in such a manner that even the longest subroutine between two rectangular pulses is safely completed. This solution is used in the present embodiment.

Secondly, it is possible to generate a control signal after the last instruction has been executed. The signal thus generated resets the next flip-flop for invoking the next subroutine.

Which of these to alternatives is adapted depends mainly on the type of digital computer used.

While we have illustrated and described the preferred embodiment of our invention, it is to be understood that we do not limit ourselves to the precise constructions herein disclosed and the right is reserved to all changes and modifications coming within the scope of the invention as defined in the appended claims.

Having thus described our invention, what we claim as new, and desire to secure by Letters Patent is:

1. Apparatus for monitoring and controlling sequence analysis of processor operations in an electronic digital computer, comprising:
   a flip-flop chain in which each flip-flop is associated with an operational step for setting up a monitoring and check sequence;
   a flip-flop ring, comprising a group of flip-flops within said chain for controlling the monitoring and check sequence;
   means for conducting an oscillator signal to a reset input of all of said flip-flops;
   said flip-flop chain including logic means for conducting control signals to a set input of all of said flip-flops;
   each of said flip-flops being so designed that a concurrence of signals of the set and reset inputs will cause the flip-flop to change state;
   said logic means permitting only one flip-flop to be set at any time;
   storage means;
   address generating means; and
   means connected between said flip-flops and said address generating means, responsive to the concurrence of an oscillator signal and a set state of one flip-flop to cause said address generating means to generate the address in said storage means of a subroutine associated with said one flip-flop.

2. The apparatus of claim 1 further including:
   means for causing said logic means to vary the sequence in which said flip-flops are set in dependence upon conditions of said electronic digital computer.

3. The apparatus of claim 1 wherein:
   the set output of each of said flip-flops forms a control signal conducted by said logic means to the set input of another flip-flop.

4. The apparatus of claim 3 wherein:
   each of said flip-flops is responsive to the trailing edges of signals at its inputs to change state.

5. The apparatus of claim 3 further including:
   means for causing said logic means to vary the sequence in which said flip-flops are set in dependence upon conditions of said electronic digital computer.

6. The apparatus of claims 1, 2, 3 or 5 further including:
   a keyboard; and
   means responsive to activation of a first predetermined key on said keyboard to set a first flip-flop in said chain to initiate said monitoring and check sequence.

7. The apparatus of claim 6 further including:
   means to cause cyclic setting of the flip-flops in said flip-flop ring, thereby repeating said monitoring and check sequence.

8. The apparatus of claim 7 further including:
   means responsive to activation of a second predetermined key on said keyboard to cause cessation of said cyclic repetition.
* * * * *